United States Patent Office 3,530,069
Patented Sept. 22, 1970

3,530,069
STABILIZED ORGANIC MATERIAL
James D. O'Neill, Southfield, Mich., assignor to Ethyl Corporation, New York, N.Y., a corporation of Virginia
No Drawing. Continuation-in-part of application Ser. No. 603,716, Dec. 22, 1966. This application Mar. 10, 1969, Ser. No. 805,808
Int. Cl. C10m 1/12, 3/32
U.S. Cl. 252—46.4
11 Claims

ABSTRACT OF THE DISCLOSURE

The combination of a dihydrocarbyl tin sulfide (e.g., di-n-butyl tin sulfide) with a phenolic antioxidant exhibits a synergistic stabilizing effect, especially in lubricating oils. Representative phenolic antioxidants are 4,4'-bis-(2,6 - di-tert-butylphenol), 4,4'-thiobis(6-tert-butyl-metacresol), 4,4'-methylene bis (2,6-di-tert-butylphenol), and 2,2'-methylene bis(4-methyl-6-tert-butylphenol).

---

This application is a continuation-in-part of application Ser. No. 603,716, filed Dec. 22, 1966, now U.S. 3,442,-806, issued May 6, 1969.

This invention relates to the stabilization of organic material with the combination of a dihydrocarbyl tin sulfide and a hindered phenolic antioxidant.

Hindered phenolic antioxidants are known to stabilize organic materials. For example, the stabilization of organic material with 4,4'-methylene bis(2,6-di-tert-butylphenol) is disclosed in U.S. 3,043,775, issued July 10, 1962. Other phenolic stabilizers are disclosed in U.S. 3,069,384, issued Dec. 18, 1962, and U.S. 2,364,338, issued Dec. 5, 1944. Furthermore dialkyl tin sulfides are disclosed as anti-wear agents and stabilizers in lubricating oils in U.S. 3,077,451, issued Feb. 12, 1963. It has now been found that when the combination of a hindered phenolic antioxidant and a dihydrocarbyl tin sulfide is employed a degree of stabilization is obtained which is totally unexpected from the amount obtained with either material by itself.

An object of this invention is to provide an improved means of stabilizing organic material. A further object is to provide a lubricating oil of improved stability. A still further object is to provide a lubricating oil of good thermal stability.

These and other objects are accomplished by providing a synergistic stabilizer which comprises:

(A) From 1–99 weight percent of a tin compound having the formula:

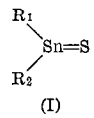

(I)

wherein $R_1$ and $R_2$ are independently selected from the group consisting of alkyl radicals containing 1–12 carbon atoms, cycloalkyl radicals containing 6–12 carbon atoms, aralkyl radicals containing 7–12 carbon atoms and aryl radicals containing 6–12 carbon atoms; and (B) From 1–99 weight percent of a compound selected from the group consisting of:

(1) Compounds having the formula:

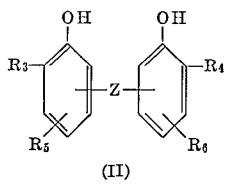

(II)

wherein $R_3$ and $R_4$ are selected from the group consisting of alpha-branched alkyl radicals containing 3–20 carbon atoms, alpha-branched aralkyl radicals contining 7–20 carbon atoms, cycloalkyl radicals containing 6–20 carbon atoms; $R_5$ and $R_6$ are selected from the group consisting of hydrogen, alkyl radicals containing 1–20 carbon atoms, cycloalkyl radicals containing 6–20 carbon atoms, and aralkyl radicals containing 7–20 carbon atoms, and Z is a divalent linking radical selected from the group consisting of sulfide radicals having the formula:

wherein $n$ is an integer from 1–3, alkylidene radicals containing 2–12 carbon atoms and alkylene radicals containing 1–12 carbon atoms;

(2) Compounds having the formula:

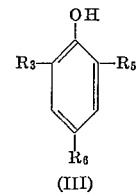

(III)

wherein $R_3$, $R_5$ and $R_6$ are selected from the same groups previously defined for these radicals;

(3) Compounds having the formula:

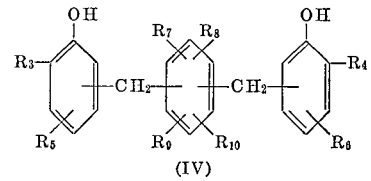

(IV)

wherein $R_3$, $R_4$, $R_5$ and $R_6$ are selected from the same groups previously defined for these radicals, and $R_7$, $R_8$, $R_9$ and $R_{10}$ are selected from the group consisting of hydrogen, the hydroxyl radical, alkyl radicals containing from 1–6 carbon atoms, radicals having the formula:

$$-OR_{11}$$

wherein $R_{11}$ is selected from the group consisting of alkyl radicals containing from 1–6 carbon atoms; radicals having the formula:

wherein $R_{12}$ is selected from the group consisting of alkyl radicals containing from 1–6 carbon atoms, aryl radicals containing from 6–12 carbon atoms, and aralkyl radicals containing from 7–18 carbon atoms; and radicals having the formula:

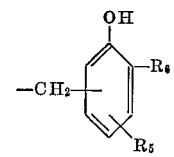

wherein $R_3$ and $R_5$ are selected from the same groups previously defined for these radicals;

(4) Compounds having the formula:

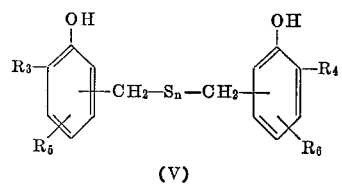

(V)

wherein $n$ is an integer from 1–3, and $R_3$, $R_4$, $R_5$ and $R_6$ are selected from the same groups previously defined for these radicals;

(5) Compounds having the formula:

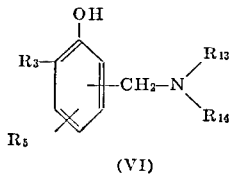

(VI)

wherein $R_3$ and $R_4$ are selected from the same groups previously defined for these radicals, and wherein $R_{13}$ and $R_{14}$ are selected from the group consisting of alkyl radicals containing from 1–12 carbon atoms, aryl radicals containing from 6–18 carbon atoms, aralkyl radicals containing from 7–18 carbon atoms, and radicals having the formula:

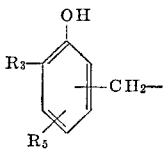

wherein $R_3$ and $R_5$ are selected from the same groups previously defined for these radicals;

(6) Compounds having the formula:

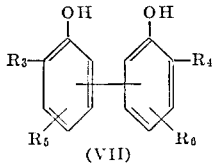

(VII)

wherein $R_3$, $R_4$, $R_5$ and $R_6$ are selected from the same groups previously defined for these radicals; and (7) Compounds having the formula:

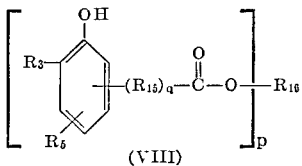

(VIII)

wherein $R_3$ and $R_5$ are selected from the same groups previously defined for these radicals, $R_{15}$ is a divalent hydrocarbon radical containing from 1 to about 3 carbon atoms, $R_{16}$ is a hydrocarbon radical containing from 1 to about 20 carbon atoms and having the valence $p$, $p$ is an integer from 1–4, and $q$ is an integer from 0–1.

Examples of tin compounds having Formula I are di-n-butyl tin sulfide, di-n-propyl tin sulfide, diisopropyl tin sulfide, di-n-pentyl tin sulfide, di-n-hexyl tin sulfide, n-propyl-n-hexyl tin sulfide, 2-sec-pentyl-isopropyl tin sulfide, dimethyl tin sulfide, di-n-dodecyl tin sulfide, dicyclohexyl tin sulfide, cyclohexyl-n-butyl tin sulfide, di(3,5-dimethylcyclohexyl) tin sulfide, dibenzyl tin sulfide, di-(α-methylbenzyl) tin sulfide, di(4-tert-butylbenzyl) tin sulfide, diphenyl tin sulfide, di(3,5-diisopropylphenyl) tin sufide, and the like.

Some representative examples of phenolic compounds having Formula II are 4,4'-methylene bis(2,6-diisopropylphenol),
2,2'-ethylidene bis(4,6-di-tert-octylphenol),
4,4'-butylidene bis(6-tert-butyl-meta-cresol),
4,4'-(1-methyl-propylidene)-bis-(2-tert-butyl-5-methylphenol),
4,4'-isopropylidene bis(2,6-di-tert-butylphenol),
4,4'-isopropylidene bis[2,6-di(α-methylbenzyl)phenol],
4,4'-methylene bis[2-tert-butyl-6-(α-methylbenzyl)phenol],
2,2'-(1-methyl-pentylidene)-bis-(2-tert-butyl-4-methylphenol),
2,2'-methylene bis(4-methyl-6-tertbutylphenol),
4,4'-benzylidene bis(2,6-di-tert-butylphenol),
4,4'-methylene bis(2,6-di-tert-butylphenol),
4,4'-(1-methyl-3-carboxypropylidene)-bis-(2,6-di-tert-butylphenol),
4,4'-cyclohexylidene bis(2,6-dicyclohexylphenol),
4,4'-cyclohexylidene bis(2,6-di-tert-butylphenol),
4,4'-ethylidene bis(2,6-di-tert-butylphenol),
4,4.-(1-methylethylene)-bis-(2,6-diisopropylphenol),
4,4'-tetra-methylene-bis(2-methyl-6-tert-butylphenol),
2,2'-decamethylene bis(4-methyl-6-tert-butylphenol),
4,4'-thiobis(6-tert-butyl-meta-cresol),
4,4'-thiobis(2-methyl-6-tert-butylphenol),
4,4'-thiobis-(2,6-di-tert-butylphenol),
2,2'-dithiobis(4,6-di-tert-butylphenol),
4,4'-thiobis[2,6-di(α-methylbenzyl)phenol],
4,4'-thiobis(2,6-dicyclohexylphenol),
4,4'-trithiobis(2-methyl-6-cyclohexylphenol),
4,4'-dithiobis[2-methyl-6-(α,α-dimethylbenzyl)phenol],
2,2'-thiobis-(4-methyl-6-tert-butylphenol), and the like.

Some examples of phenolic compounds having Formula III are 2,6-di-tert-butylphenol,
2,4,6-tri-tert-butylphenol,
2,6-di-tert-butyl-4-methylphenol,
o-tert-butylphenol,
2,6-dicyclohexylphenol,
2,6-dicyclohexyl-4-methylphenol,
2-methyl-6-tert-butylphenol,
2,6-di(α-methylbenzyl)phenol,
2,4-di(α,α-dimethylbenzyl)phenol,
2,4-di-tert-octylphenol,
2,4,6-tri(α-methylbenzyl)phenol,
o-sec-eicosylphenol,
2-(2-sec-dodecyl)-4-methylphenol, and the like.

Examples of compounds having Formula IV are 2,4,6-tri-(3,5-di-tert-butyl-4-hydroxybenzyl)phenol,
1,3,5-tri-methyl-2,4,6-tri(3,5-ditert-butyl-4-hydroxybenzyl)benzene,
2,6-di(3,5-di-tert-butyl-4-hydroxybenzyl)-4-tert-butylphenol,
2,4-di[3-tert-butyl-4-hydroxy-5-(2-sec-dodecyl)benzyl] phenyl acetate,
2,6-di(3,5-di-tert-butyl-4-hydroxybenzyl)-4-tert-butylphenyl propionate,
2,6-di(3,5-di-tert-butyl-4-hydroxybenzyl)-4-tert-butylanisole,
1,2,4,5-tetramethyl-3,6-di(3,5-di-tert-butyl-4-hydroxybenzyl)benzene,
2,6-di-(2-hydroxy-3-tert-butyl-5-methylbenzyl)-4-methyl hexoxybenzene,
1,3,5-tri(3,5-di-tert-butyl-4-hydroxybenzyl)benzene, and the like.

Representative examples of phenolic compounds having Formula V include

α,α'-thiobis(2,6-di-tert-butyl-p-cresol),
α,α'-thiobis[2,6-di(α-methylbenzyl)-p-cresol],
α,α'-[4-tert-octyl-6-(α,α-dimethylbenzyl)-p-cresol],
α,α'-dithiobis 2-methyl-6-sec-butyl-p-cresol),
α,α'-thiobis(2,6-dicyclohexyl-p-cresol),
α,α'-trithiobis(2-tert-butyl-4-methyl-o-cresol), and the like.

Examples of phenolic compounds having Formula VI are 2,6-di-tert-butyl-α-dimethylamino-p-cresol,
2,4,6-tris(3,5-di-tert-butyl-4-hydroxybenzyl)amine,
3,5-dicyclohexyl-4-hydroxybenzyl-dimethylamine,
N,N-di(3,5-di-tert-butyl-4-hydroxybenzyl)phenylamine,
N-(3,5-dicyclohexyl-4-hydroxybenzyl)-N-methylaniline-N-phenylamine, 2-tert-dodecyl-4-methyl-α-dibenzylamino-o-cresol, and the like.

Some representative examples of the phenolic compounds represented by Formula VII are 4,4'-bis(2,6-di-tert-butylphenol),
4,4'-bis(2,6-dicyclohexylphenol),
4,4'-bis(2-methyl-6-tert-octylphenol),
2,2'-bis(4-methyl-6-tert-butylphenol),
4,4'-bis[2,6-di-(α-methylbenzyl)phenol], and the like.

Examples of compounds having Formula VIII include pentaerythritol-tetrakis-[3,3,5-di-tert-butyl-4-hydroxyphenyl)-propionate],
pentaerythritol-tetrakis-3,5-di-tert-butyl-4-hydroxybenzoate,
ethyleneglycol bis[3-(3,5-di-tert-butyl-4-hydroxyphenyl)propionate],
hydroquinone bis[2-(3,5-di-tert-butyl-4-hydroxyphenyl)acetate],
methyl 3-methyl-5-tert-butyl-4-hydroxybenzoate,
pentaerythritol-tetrakis[3-(3-tert-butyl-5-methyl-4-hydroxyphenyl)-propionate],
lauryl 3,5-di-(α-methylbenzyl)-4-hydroxybenzoate,
glycerine tris[3-(2-hydroxy-3-tert-butyl-4-methylphenyl)-propionate], and the like.

Of the foregoing, the preferred synergist combination is represented by the combination of the tin compounds of Formula I and the phenolic compounds of Formula II. Of these, the more preferred combinations are represented by the combination of di-butyl tin sulfide with at least one of the folowing phenolic compounds:

4,4'-thiobis(2,6-di-tert-butylphenol),
4,4'-methylene bis(2,6-di-tert-butylphenol),
4,4'-thiobis(2-methyl-6-tert-butyl-phenol),
4,4'-thiobis(6-tert-butyl-meta-cresol), and
2,2'-thiobis-(4-methyl-6-tert-butylphenol).

Of the foregoing, the most preferred combinations are represented by the combination of di-butyl tin sulfide with 4,4'-thiobis(2,6-di-tert-butylphenol) and the combination of di-butyl tin sulfide with 4,4'-methylenebis(2,6-di-tert-butylphenol).

The synergistic combinations are effective stabilizers of organic material. By the term "organic material" is meant those organic materials normally tending to undergo oxidative and thermal degradation. Examples of such materials include plastics, liquid hydrocarbon fuels, lubricants, functional fluids and rubber.

In this invention the term "plastic" is used to represent any one of a group of materials which consist of, or contains as an essential ingredient, a thermosetting or thermoplastic substance of high molecular weight, and which, while solid in the finished state, at some stage in its manufacture is soft enough to be formed into various shapes usually through the application, singularly or together, of heat and pressure. Examples of such plastics are the phenolic resins; the aminos, such as unreaformaldehyde resins and melamine-formaldehyde resins; the unsaturated and saturated polyester resins, including the oil modified alkyd resins; the styrene homo-polymers and co-polymers, such as polystyrene and styrene-acrylonitrile co-polymers; the acrylic monomers and polymers; substituted acrylic and methacrylic acids, their salts, esters, and other derivatives, such as nitriles and amides; the cellulosics, such as cellulose acetate, cellulose acetate butyrate, cellulose nitrate, cellulose propionate, ethyl cellulose, nitrocellulose, carboxymethyl cellulose, hydroxyethyl cellulose, and cellophane; linear and branched polyolefins, such as polyethylene and polypropylene; the polyurethanes; the vinyl homopolymers and co-polymers, such as polyvinyl chloride, polyvinyl acetate, polyvinyl chloride acetate, polyvinyl acetate, polyvinyl alcohols, polyvinyl butyral, and polyvinyl formal, polyvinylidene chloride, polyvinylidene co-polymers, polyvinyl alkylethers, polyvinyl pyrrolidene, polyvinyl carbazole, polyvinyl naphthenate, polyvinyl benzoate, and polyvinyl fluoride; the polyamides; and the condensation products of diabasic organic acids and diamines such as nylon.

The above material also includes those plastics which are in combination with other material, for example, with fillers such as flour, cotton, shredded or chopped cloth, chopped canvas, paper pulp forms, asbestos, powdered mica, calcium carbonate, carbon, graphite, quartz, diatomaceous silica, fibraus glass, barytas, calcium silicate, iron, barium sulfate, litharge and clay; plasticizers such as phthalates, phosphates, esters including adipates, azelates and sebacates, polymeric plasticizers including polyesters of adipic, azelaic, and sebacic acid with glycols terminated with long-chain fatty acids, epoxy, fatty acid esters, esters of glycols such as phthalyl glycolates, sulfonamides; secondary plasticizers including hydrocarbons, chlorinated hydrocarbons and nitrated hydrocarbons; polymerizable plasticizers; stabilizers such as inorganic acid derivatives including basic lead carbonate, tribasiclead sulfate, dibasiclead phosphite, sodium carbonate, di-, and trisodium phosphate and the salts of polyphosphoric acid partial esters, organic acid salts including the metal salts of stearic, lauric, ricinoleic, capric, caproic, myristic, 2-ethylhexanoic, maleic, phthalic, naphthenic, alkylated benzoic and salicylic acids, organometallics including dibutyltin dilaurate, dibutyltin maleate and their mixtures, dibutyltin monomethoxy, monomethylmaleate and the dialkyltin mercaptans, organic compounds including the epoxides, polyols, nitrogen derivatives; antioxidants; colorants such as the dyes, the organic pigments and inorganic pigments; and reinforcing fibers.

The additives of this invention can be incorporated into the plastic material by a variety of means. For example, a convenient method of addition to plasticized materials is to dissolve the stabilizer in the plasticizer. The stabilizer can also be added by dry blending with the resin powder or granules prior to processing. For example, with polyesters, the stabilizer can be added to the resin from a master batch solution of the stabilizer in the monomer, or they can be incorporated by stirring into the cut polyester resin system; in polystyrene a convenient procedure is to add these materials to the polystyrene beads. The mixture is then dry-tumbled and extruded. With cellulosics, incorporating the stabilizer in the plasticizer is very convenient. In vinyl plastics the stabilizer may be added to a dry powder form of the rigid vinyl co-polymer. The mixture is then milled and calendered or extruded. In polyethylene the stabilizer can be added to the raw polymer at the same time as other ingredients. The resultant mixture is then subjected to extrusion or calendering. The stabilizer can also be added to dry polyethylene and mixed by milling. In plastics containing fillers of the various sorts, the stabilizer can be premixed with the filler before its incorporation.

In order to stabilize the organic material all that is required is that a stabilizing quantity of the additive composition be added to the organic material. It is our intention not to limit our invention to any particular concentration range, inasmuch as the concentration of additive required for any particular application can be quite different from that required for another application. However, we have found that, in most cases, a concentration of up to about 5 percent of the additive compound in the organic material gives satisfactory results. A preferred range is from 0.001 to about 3 percent by weight of the additive compound in the organic material. I have found this preferred range to give excellent results in most embodiments of my invention.

The following examples illustrate the stabilized organic compositions of this invention. All parts are parts by weight unless otherwise indicated.

EXAMPLE 1

Five weight percent of a stabilizer comprising 10 weight percent of di-n-butyl tin sulfide and 90 weight percent of 4,4'-methylene bis(2,6-di-tert-butylphenol) is mixed with the dibutyl ester of phthalic acid. This solution is sprayed onto powdered cellulose acetate. The mixture is heated, blended and poured into a mold cavity wherein it is extruded into a sheet.

EXAMPLE 2

Two-hundredths weight percent of a stabilizer comprising 1 weight percent of di-phenyl tin sulfide and 99 weight percent of 4,4'-thiobis(2,6-di-tert-butylphenol) is added to dry powdery polyvinyl acetate. The mixture is then milled and extruded into sheets, yielding a stable plastic.

EXAMPLE 3

Polyester resin is cut finely and stirred in a heated vessel. 0.08 weight percent of a stabilizer comprising 50 weight percent di-cyclohexyl tin sulfide and 50 weight percent of 2,2'-methylene bis(4-methyl-6-tert-butylphenol) is added and the mixture is heated, poured into a mold and extruded into a sheet, yielding a highly stable polyester plastic.

EXAMPLE 4

One weight percent of a stabilizer comprising 5 weight percent of n-butyl-isopropyl tin sulfide and 95 weight percent of $\alpha,\alpha'$-thiobis(6-tert-butyl-m-cresol) is added to polystyrene beads. The mixture is thoroughly mixed, poured into a mold and extruded into sheets, yielding a polystyrene plastic of enhanced thermal and oxidative stability.

EXAMPLE 5

Methyl methacrylate is mixed with 0.001 weight percent of a stabilizer comprising 99 weight percent of di-amyl tin sulfide and 1 weight percent of 1,3,5-tri-methyl-2,4,6 - tri(3,5 - di - tert - butyl - 4 - hydroxybenzyl)benzene. It is then poured into a mold and extruded under heat and pressure into a thin sheet.

EXAMPLE 6

Three weight percent of a stabilizer comprising 25 weight percent of di-phenyl tin sulfide and 75 weight percent of 2,6-di-tert-butyl-p-cresol is mixed with dry powdered half-second butyrate plastic, poured into a mold and extruded with heat and pressure into a thin sheet of great stability.

EXAMPLE 7

To a master batch of high density polyethylene having a specific gravity of 0.965, a compression ratio of 2.0, a tensile strength of 5500 p.s.i., a compression strength of 2400 p.s.i., a Shore D hardness of 70 and a heat distortion temperature under 66 p.s.i. of 180° F. is added 3 percent of a stabilizer comprising 5 weight percent of di-n-butyl tin sulfide and 95 weight percent of 4,4'-thiobis(2,6-di-tert-butylphenol), yielding a polyethylene of enhanced stability.

EXAMPLE 8

A linear polyethylene having a high degree of crystallinity, up to 93 percent, and less than one ethyl-branched chain per 100 carbon atoms, a density of about 0.96 and which has about 1.5 double bonds per 100 carbon atoms is treated with $50 \times 10^{-6}$ roentgens of $\beta$ radiation. To the thus irradiated polymer is added 0.001 percent of a stabilizer comprising 75 weight percent of dilauryl tin sulfide and 25 weight percent of 4,4'-thiobis(2-methyl-6-tert-butylphenol), yielding a highly stable organic plastic.

EXAMPLE 9

Two parts of a stabilizer comprising 15 weight percent of di-methyl tin sulfide and 85 weight percent of 2,4,6-tri(3,5 - di - tert - butyl - 4 - hydroxybenzyl)phenol are added with milling to 100 parts of a low density polyethylene which has a specific gravity of 0.910, a compression ratio of 1.8, a tensile strength of 1000 p.s.i., a Shore D hardness of 41 and a heat distortion temperature under 66 p.s.i. of 105° C. The resulting product is vastly improved in its stability towards the deleterious effects of heat.

EXAMPLE 10

To 10,000 parts of a medium density polyethylene having a specific gravity of 0.933, a compression ratio of 2.0, a tensile strength of 1800 p.s.i., a Shore D hardness of 60 and a heat distortion temperature under 66 p.s.i. of 135° F. is added 10 parts of a stabilizer comprising 1 percent of di-n-butyl tin sulfide and 99 weight percent of 2,6-di-tert-butylphenol, yielding a highly stable polyethylene plastic.

EXAMPLE 11

To a batch of polypropylene having a specific gravity of 0.9, a tensile strength of 4300 p.s.i., a compression strength of 8500 p.s.i., a Rockwell hardness of 85 and a heat distortion temperature under 66 p.s.i. of 210° F. is added 3 weight percent of a stabilizer comprising 10 weight percent of di-n-butyl tin sulfide and 90 weight percent of $\alpha,\alpha'$-thiobis(2,6-di-tert-butyl-p-cresol), resulting in a polypropylene plastic of enhanced stability.

EXAMPLE 12

To a polypropylene having a specific gravity of 0.91, a heat distortion temperature of 230° F., a Rockwell hardness of 110, a tensile strength of 5700 p.s.i. and a compression strength of 10,000 p.s.i. is added 0.5 weight percent of a stabilizer comprising 20 weight percent of di-n-butyl tin sulfide and 80 weight percent of pentaerythritol tetrakis[3 - (3,5 - di - tert - butyl - 4 - hydroxyphenyl)propionate], resulting in a product having excellent stability towards the deteriorative effects of heat and oxygen.

EXAMPLE 13

To 5000 parts of a Ziegler type polypropylene is added 10 parts of a stabilizer comprising 10 weight percent of di-n-butyl tin sulfide and 90 weight percent of 4,4'-methylene bis(2,6-di-tert-butylphenol), yielding a plastic of excellent stability.

EXAMPLE 14

To 20,000 parts of polytetrafluoroethylene molding compound having a density of 2.22, a tensile strength of 4500 p.s.i., a compression strength of 1700 p.s.i., a Shore D hardness of 65 and a heat distortion temperature of 250° F. is added 10 parts of a stabilizer comprising 50 weight percent of di-benzyl tin sulfide and 50 weight percent of 3,5-di-tert-butyl-4-hydroxybenzyl sulfide, yielding a stable organic material.

EXAMPLE 15

To a vinyl acetate molding compound having a specific gravity of 1.18, a tensile strength of 5000 p.s.i., and a heat distortion temperature of 100° F. is added 0.5 weight percent of a stabilizer comprising 75 weight percent of diisopropyl tin sulfide and 25 weight percent of 2,6-di-tert-butyl-$\alpha$-dimethylamino-p-cresol, yielding a highly stable polyvinyl acetate.

EXAMPLE 16

To 100 parts of polyvinylchloride molding compound having a specific gravity of 1.45, a compression ratio of 2.4, a tensile strength of 9000 p.s.i., a compression strength of 13,000 p.s.i., a Shore D hardness of 90 and a heat distortion temperature of 165° F. is added one part of a stabilizer comprising 30 weight percent of di-n-butyl tin sulfide and 70 weight percent of 4,4'-bis(2,6-di-tert-butylphenol), yielding a polyvinyl chloride of increased stability.

EXAMPLE 17

To 5000 parts of polychlorotrifluoroethylene having a density of 2.1, a compression ratio of 2.0, a tensile strength of 5700 p.s.i., a compression strength of 32,000 p.s.i. and a Rockwell hardness of 110 is added 10 parts of a stabilizer comprising 13 weight percent of di-sec-butyl tin sulfide and 87 weight percent of 2,2'-thiobis(4-methyl-6-tert-butylphenol), yielding an organic plastic of enhanced stability.

The stabilizers of this invention are also very effective antioxidants for rubber materials such as polybutadiene, methyl rubber, polyisoprene rubber, polybutene rubber, styrene-isoprene rubber, natural rubber, butyl rubber, SBR rubber, GR-N rubber, isobutylene-isoprene rubber, piperylene rubber, ABS rubber, dimethylbutadiene rubber, poly-cis-butadiene rubber, styrene-chloroprene rubber, and the like. Thus, a preferred embodiment of the present invention is a rubber containing as an antioxidant therefor a synergistic stabilizer comprising a dihydrocarbyl tin sulfide and a phenolic compound selected from the classes previously defined. The stabilizer is incorporated into the hubber by milling, Banbury mixing, or similar process, or is emulsified and the emulsions added to the rubber latex before coagulation. In the various embodiments of this invention the stabilizer is used in small antioxidant amounts, generally ranging from about 0.001 to about 3.0 percent, based on the rubber.

As used in the description and claims, the term "rubber" is employed in a generic sense to define a high molecular weight plastic material which possesses high extensibility under load coupled with the property of forcibly retracting to approximately its original size and shape after the load is removed. It is preferable that the rubber be a sulfur-vulcanizable rubber, such as India rubber, reclaimed rubber, balata, gutta percha, rubbery conjugated diene polymers and copolymers exemplified by the butadiene-styrene (SBR), butadiene-acrylonitrile (GR-N or Paracril) rubbers, polyisoprene, poly-cis-butadiene, and the like, although the invention is applicable to the stabilization of any rubbery, high molecular weight organic material which is normally susceptible to deterioration in the presence of oxygen, air, or ozone. The nature of these rubbers is well known to those skilled in the art.

The rubber compositions of the present invention are illustrated by the following specific examples, wherein all parts and percentages are by weight.

EXAMPLE 18

To illustrate the enhanced oxygen resistance of the rubber compositions of this invention a light-colored stock is selected for test. This stock had the following composition:

| | Parts by weight |
|---|---|
| Pale crepe rubber | 100.00 |
| Zinc oxide filler | 50.00 |
| Titanium dioxide | 25.00 |
| Stearic acid | 2.00 |
| Ultramarine blue | 0.12 |
| Sulfur | 3.00 |
| Mercaptobenzothiazole | 1.00 |
| | 181.12 |

To the above base formula is added one part by weight of a stabilizer comprising 1 percent of di-n-butyl tin sulfide and 99 percent of 4,4'-methylene bis(2,6-di-tert-butylphenol). Individual samples are cured for 30 minutes at 274° F. using perfectly clean molds with no mold lubricant. The resulting vulcanized natural rubber is resistant to oxidative degradation.

EXAMPLE 19

To a synethetic rubber master batch comprising 100 parts of SBR rubber (50:50 S/B ratio) having an average molecular weight of 60,000, 50 parts of mixed zinc propionate-stearate, 50 parts of carbon black, 5 parts of road tar, 2 parts of sulfur, and 1.5 parts of mercaptobenzothiazole is incorporated 1.5 parts of a stabilizer comprising 10 weight percent of di-n-butyl tin sulfide and 90 weight percent of 4,4'-thiobis(6-tert-butyl-m-cresol). This batch is then cured for 60 minutes at 45 p.s.i. of steam pressure.

EXAMPLE 20

SBR rubber is compounded according to the following formula:

| | Parts |
|---|---|
| SBR latex (S/B ratio 29/71) | 100 |
| Wax | 2 |
| Ultramarine dye | 0.1 |
| Zinc oxide | 70 |
| Titanium dioxide | 20 |
| Sulfur | 3 |
| Stearic acid | 1.2 |
| Mixture of 25% di-phenyl tin sulfide and 75% 2,6-di-tert-butylphenol | 1 |
| Benzothiazyl disulfide | 0.4 |
| Amine activator | 0.5 |

This stock is mixed in a Banbury blender and then vulcanized for 60 minutes at 280° F.

EXAMPLE 21

A butadiene-acrylonitrile copolymer is produced from butadiene-1,3 and 32 percent of acrylonitrile. Two percent (based on the dry weight of the copolymer) of a stabilizer comprising 50 weight percent of di-benzyl tin sulfide and 50 weight percent of 2,2'-methylene bis(4-methyl-6-tert-butylphenol) is added as an emulsion in sodium oleate solution to the latex obtained from emulsion copolymerization of the monomers. The latex is coagulated with a pure grade of aluminum sulfate and the coagulum, after washing, is dried for 20 hours at 70° C. The latex is then ready for further compounding and vulcanization.

The stabilizers are eminently useful for stabilizing lubricants. For example, they improve the stability of mineral oils and greases; silicon-containing oils and greases including the siloxanes, silanes, and silicate esters; fluorocarbon oils and greases; diester oils and greases, aromatic ether oils and greases; phosphate ester oils and greases; polyalkylene glycol oils and greases; synthetic hydrocarbon oils and greases formed from polybutene oils and other low molecular weight polyolefin oils and tetrahydrofuran polymer oils and greases.

The minerals oils and greases include hydrocarbon oils and greases obtained through conventional refining processes of the petroleum crude stocks. Such conventional refining processes include distillation, solvent extraction, clay filtration, dewaxing, acid treatment and propane deasphalting. The constituents of mineral oils and greases may be summarized as (1) straight chain paraffins, (2) branched chain paraffins, (3) naphthenes, (4) aromatics and (5) mixed aromatic-naphthene-paraffin.

The silicon-containing oils and greases include the polysiloxane oils and greases of the type, polyalkyl, polyaryl, polyalkoxy, and polyaryloxy such as the polymethyl siloxane, polymethylphenol siloxane and polymethoxyphenoxy siloxane. Further included are silicate ester oils, such as the tetraalkyl and tetraaryl silicates of the tetra-2-ethylhexyl and tetra-p-tert-butylphenyl types and the silanes such as the mono-, di-, and trisilanes. Also included are the chlorinated siloxanes such as the chlorophenyl siloxanes, and chloroalkyl siloxanes. Examples of typical silanes are diethyl dihexylsilane, dibutyl diheptylsilane, diphenyl diethylsilane and bis(n-dodecyl)dichlorosilane and bis(n-dodecyl dioctyl)-silane.

The fluorocarbons are compounds which contain carbon and fluorinne. This class of compounds is analogous structurally to the hydrocarbons. Thus, the compounds are generally linear polymers built up of a recurring unit which is

As used in the specification the term fluorocarbon is meant to include compounds which can also contain chlorine and hydrogen. Such compounds are linear polymers built up from a recurring unit such as

in which at least one X is fluorine and the other X's are chlorine, fluorine or hydrogen. Thus, the fluorocarbon can be polytetrafluoroethylene, polymonochloridifluoroethylene, polymonochloromonofluoroethylene and the like.

The polyester oils and greases are esters formed by the reaction between polybasic acids and alcohols or monobasic acids and glycols. The diesters of branched chain aliphatic alcohols and straight chain dibasic acids have been found to be the most desirable polyesters for lubricating purposes. The synthetic polyesters have high viscosity indices, high flash points and exceptionally low pour points as compared to petroleum oils of similar viscosity and have found use chiefly as aircraft instrument oils, hydraulic and damping fluids and precision bearing lubricants wherein their exceptionally low temperature fluidity properties are particularly suited. Typical examples of such esters are diisooctyl azelate, di(2-ethylhexyl)sebacate, di-sec-amyl sebacate, diisooctyl adipate, di(2-ethylhexyl)adipate, di(2-ethylhexyl-azelate, di(1-methyl-4-ethyloctyl)glutarate, di-isoamyl adipate, di(2 - ethylhexyl(glutarate, di(2 - ethylbutly)adipate, ditetradecylsebacate and di(2-ethylhexyl)pinate.

The polyalkylene glycol oils and greases are composed of long chain linear polymers which are generally formed from the reaction of an aliphatic alcohol and an epoxide such as ethylene or propylene oxide. The products of such a reaction are complex and thus polyalkylene glycol lubricants may contain the ethers and esters of polyethylene and polypropylene glycol. (Also included within this terminology are the reaction products formed from higher polyalkylene oxides, polyglycidyl ethers and polythioglycols.)

These substances are manufactured and marketed in considerable quantities under the trade name "Ucon." They are useful lubricants because of their flat viscosity-temperature curves, their low viscosity in the subzero temperature range as well as their low freezing points. They generally have viscosities at 100° F. ranging from 135 to 1200 Saybolt Universal seconds, flash points ranging from 300 to 500° F. and specific gravities ranging from about 0.97 to about 1.01.

Tetarahydrofuran polymer oils and greases are formed by the copolymerization of tetrahydrofuran and an alkylene oxide such as ethylene oxide. In the polymerization reaction the furan rings are ruptured forming straight chain tetrahydrofuran polymers to which the ethylene oxide groups are probably attached as side chains.

Polybutene lubricants are formed from the polymerization of isobutene. Isobutene, usually containing also some normal butene, is polymerized at low temperatures in the presence of a catalyst such as aluminum chloride to yield polymer oils of a wide range of molecular weights and viscosities. The polybutene oils have viscosities ranging from about 40 to over 3000 Saybolt Universal seconds at 210° F. corresponding to molecular weights from about 300 to 1500. Their flash points vary from about 200 to 500° F. and their pour points range from about —65° F. to about 35° F. The polybutenes have the same specification tests as petroleum oils, although they tend to have lower pour points, flash points and carbon residue than petroleum lubricants having an equivalent viscosity.

A variety of polymer oils, similar to the polybutenes, but utilizing other olefins of relatively low molecular weight are suitable as lubricant materials. These include polymers produced from propylenes, pentenes, hexenes, octenes, etc., or mixtures of the same. These various polymer oils are prepared in a manner very similar to the polybutenes and have physical properties of a similar order.

The phosphate esters are a class of lubricant materials whose chief beneficial characteristic is their lack of flammability. These materials, as characterized by the aryl esters of phosphoric acid, have good lubricity or oil-like properties, high film strength, resistance to heat and oxidation over a wide range of temperatures and are non-corrosive. Typical examples of such phosphate esters are tricresyl phosphate, triphenyl phosphate, trixylyl phosphate and the like.

The aromatic ethers are a class of compounds which are characterized in that a portion of the molecule contains at least two aryl groups bridged by an ether oxygen atom. The aromatic portion of the molecule may be substituted by halogen or alkyl groups. In general, these compounds have a high order of thermal and oxidative stability at high temperatures. They are further very stable toward radiation and thus will find future application in lubricating nuclear powered engines. Typical examples of these ethers are bis(methylphenoxy)benzene, bis(phenoxy)benzene, bis(chlorophenoxy)benzene, and bis(nonylphenoxy)benzene.

The following examples illustrate lubricant compositions of my invention. Unless otherwise specified, the proportions given in these examples are on a weight basis.

EXAMPLE 22

One part of 10 percent di-butyl tin sulfide and 90 percent 4,4' - methylene bis(2,6 - di-tert-butylphenol) was blended with 99 parts of a paraffinic, mineral white oil having a sulfur content of 0.07 percent, a kinematic viscosity (ASTM D–445) of 17.15 centistokes at 100° F. and 3.64 centistokes at 210° F. The viscosity index of the base oil (ASTM D–567) is 107.5.

EXAMPLE 23

To 99.15 parts of a halogen-substituted polyphenyl-polymethyl siloxane was added and blended 0.85 part of 25 percent dicyclohexyl tin sulfide and 75 percent α,α'-thiobis[2,6 - di(α - methylbenzyl)-p-cresol]. The siloxane fluid is Dow Corning F–60 fluid having a viscosity of 71 centistokes at 25° C. and 24 centistokes at 75° C., a specific gravity of 1.03 at 25° C., a freezing point of —70° C. and a flash point of 540° F.

EXAMPLE 24

Ten parts of 50 percent dilauryl tin sulfide and 50 percent 4,4'-thiobis(2,6-di-tert-butylphenol) are blended with 90 parts of a grease comprising 12 percent of lithium stearate, 2.5 percent of polybutene (12,000 molecular weight), 0.2 percent of 4-tert-butyl-2-phenyl phenol and 85.3 percent of di(2-ethylhexyl)adipate.

EXAMPLE 25

Five parts of 75 percent diethyl tin sulfide and 25 percent 2,6-di-tert-butyl-p-cresol are blended with 95 parts of bis(n-dodecyl)di-n-propyl silane. Bis(n-dodecyl)di-n-propyl silane has a boiling point of 208° C. at 0.50 mm. of mercury, a melting point of 5° C. and a density, $d_4^{25}$, of 0.8181. Its viscosity is 14.76 centistokes at 100° F., 3.68 centistokes at 210° F. and 1.10 centistokes at 400° F.

EXAMPLE 26

Two parts of 90 percent di-butyl tin sulfide and 10 percent ethylene glycol bis(3,5 - di - sec-butyl-4-hydroxybenzoate) are blended with 98 parts of an aromatic ether which is bis(methylphenoxy)benzene. The bis(methylphenoxy)benzene is a mixture of isomers in which the methyl groups are ortho, meta, or para to the ether oxygen linkage. The mixture is liquid in the temperature range from −5 to 741° F. at 760 mm. pressure. Its viscosity is 550 centistokes at 32° F., and it is thermally stable to 716° F.

EXAMPLE 27

Four parts of 1 percent diamyl tin sulfide and 99 percent 2,2′-methylene bis(4-methyl-6-tert-butylphenol) are blended with an LB–165 polyalkylene glycol oil. The oil has a viscosity of 165 Saybolt Universal seconds (SUS) at 100° F. and 48.6 SUS at 210° F. Its viscosity index is 148, its ASTM pour point is −50° F., its flash point is 410° F. and its fire point is 460° F.

EXAMPLE 28

Three one-hundredths part of 30 percent diphenyl tin sulfide and 70 percent 2,6-di-tert-butyl-α-dimethylamino-p-cresol are blended with 99.97 parts of a commercial polybutene oil. The oil has a molecular weight of approximately 330, a viscosity of 114 SUS at 100° F., and a viscosity of 40.6 SUS at 210° F. Its viscosity index is 101, its flash point is 230° F., and its pour point is −65° F.

EXAMPLE 29

Six parts of 15 percent isopropylphenyl tin sulfide and 85 percent of 2,4,6-tri(3,5-di-tert-butyl-4-hydroxybenzyl)phenol are blended with 94 parts of a tetrahydrofuranethylene oxide copolymer oil. The oil has a tetrahydrofuranethylene oxide ratio of two to one, a Saybolt viscosity at 210° F., of 83 SUS and a Saybolt viscosity at 100° F. of 462 SUS.

EXAMPLE 30

Eight parts of 45 percent dibenzyl tin sulfide and 55 percent 1,3,5-tri-methyl - 2,4,6 - tri(3,5-di-tert-butyl-4-hydroxybenzyl)benzene are blended with 92 parts of a complex mineral oil base grease, comprising 13.8 parts of lithium stearate, 1.7 parts of calcium stearate, 33.8 parts of a California solvent refined paraffinic base oil (356 SUS at 100° F.), and 50.7 parts of a California solvent refined paraffinic base oil (98 SUS at 100° F.).

EXAMPLE 31

Seven one-hundredths parts of 50 percent dibutyl tin sulfide and 50 percent pentaerythritol-tetrakis[3(3,5-di-tert-butyl-4-hydroxyphenyl)propionate] are blended with 99.93 parts of tricresyl phosphate. Tricresyl phosphate has a viscosity of 25° C. of 285 SUS, its flash point is 250° C., its boiling range at 10 mm. of mercury is between 275 and 290° C. and its autoignition temperature is above 1000° C.

The synergistic stabilizers impart outstanding oxidative and thermal stability to hydrocarbon-derived lubricating oils. In order to demonstrate this property comparative tests were conducted. The test used was the Panel Coker Test. This test is described in "Aeronautical Standards of the Departments of Navy and Air Force," Spec. MIL–L 7808C, dated Nov. 2, 1955. In the test, a solvent-refined neutral hydrocarbon lubricating oil is placed in a sump under a metal plate heated to 550° F. The oil is periodically splashed against the heated plate and allowed to drain back into the sump. The oil is splashed for 5 seconds and drained for 55 seconds. This cycle is repeated for 10 hours. Following this, the metal plate is washed with hexanes and the weight gain determined. Any gain in weight is due to thermal and oxidative breakdown of the oil leaving a carbonaceous deposit. The first series of tests were carried out employing as stabilizers di-butyl tin sulfide, 4,4′-methylene bis(2,6-di-tert-butylphenol), and the combination of the two. The deposit weight formed is shown in the following table.

TABLE 1

| Additive | Conc., percent | Deposit wt. |
|---|---|---|
| 4,4′-methylene bis(2,6-di-tert-butylphenol) | 1 | 143 |
| Di-butyl tin sulfide | 0.1 | 22 |
| Di-butyl tin sulfide | 0.5 | 13 |
| 4,4-methylene bis(2,6-di-tert-butylphenol) <br> Di-butyl tin sulfide | 1 <br> 0.1 | 4 |

As the above data shows, 0.1 percent di-butyl tin sulfide results in a deposit of 22 mg. On increasing the amount of di-butyl tin sulfide, to 0.5 percent, the deposit weight only decreases to 13 mg. Surprisingly, the combination of 0.1 percent of di-butyl tin sulfide with 1 percent of 4,4′-methylene bis(2,6-di-tert-butylphenol) resulted in a deposit weight of only 4 mg. This, despite the fact that 1 percent of 4,4′-methylene bis(2,6-di-tert-butylphenol) by itself gave 143 mg. of deposit.

Further tests were conducted with sulfur-bridged bisphenols. The combinations tested were 4,4′-thiobis(2,6-di-tert-butylphenol) and 4,4′-thiobis(2-methyl-6-tert-butylphenol) both in combination with di-butyl tin sulfide. The following results were obtained.

TABLE 2

| Additive | Conc., percent | Deposit wt. |
|---|---|---|
| 4,4′-thiobis(2,6-di-tert-butylphenol) | 1 | 6 |
| 4,4′-thiobis(2-methyl-6-tert-butylphenol) | 1 | 16 |
| Di-butyl tin sulfide | 0.1 | 22 |
| 4,4′-thiobis(2,6-di-tert-butylphenol) <br> Di-butyl tin sulfide | 1 <br> 0.1 | 4 |
| 4,4′-thiobis(2-methyl-6-tert-butylphenol) <br> Di-butyl tin sulfide | 1 <br> 0.1 | 8 |
| Di-butyl tin sulfide | 0.5 | 37 |
| 4,4′-thiobis(2,6-di-tert-butylphenol) | 0.5 | 137 |
| Di-butyl tin sulfide <br> 4,4′-thiobis(2,6-di-tert-butylphenol) | 0.5 <br> 0.5 | 4 |

Referring to the above table, it is seen that 1 percent of 4,4′-thiobis(2-methyl-6-tert-butylphenol) resulted in 16 mg. of deposit, and 0.1 percent di-butyl tin sulfide yielded 22 mg. of deposit. The combination of the two gives a lubricant which formed only 8 mg. of deposit.

Even more striking are the results obtained with 4,4′-thiobis(2,6-di-tert-butylphenol). At the 1 percent level it gives a lubricating oil depositing 6 mg. However, when combined with 0.1 percent di-butyl tin sulfide, which by itself gives a lubricating oil depositing 22 mg., a highly stable oil yielding only 4 mg. of deposit is obtained. Even when the amount of 4,4′-thiobis(2,6-di-tert-butylphenol) and di-butyl tin sulfide is decreased 50 percent the oil still retains its unusual stability and yields only a 4 mg. deposit. The foregoing tests demonstrate that the synergistic stabilizing compositions of the present invention greatly enhance the thermal and oxidative stability of the organic material.

What is claimed is:

1. A composition comprising a mixture of:
   (A) from 1–99 weight percent of a tin compound having the formula:

wherein $R_1$ and $R_2$ are independently selected from the group consisting of alkyl radicals containing 1–12 carbon atoms, cycloalkyl radicals containing 6–12 carbon atoms, aralkyl radicals containing 7–12 carbon atoms and aryl radicals containing 6–12 carbon atoms, and (B) from 1–99 weight percent of a phenolic compound having the formula:

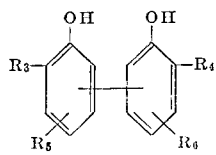

wherein $R_3$ and $R_4$ are radicals selected from the group consisting of alpha-branched alkyl radicals containing 3–20 carbon atoms, alpha-branched aralkyl radicals containing 8–20 carbon atoms and cycloalkyl radicals containing 6–20 carbon atoms, and $R_5$ and $R_6$ are selected from the group consisting of hydrogen, alkyl radicals containing 1–20 carbon atoms, cycloalkyl radicals containing 6–20 carbon atoms and aralkyl radicals containing 7–20 carbon atoms.

2. Organic material normally subject to degradation in the presence of oxygen containing a stabilizing amount of a composition of claim 1.

3. Lubricating oil containing a stabilizing amount of a composition of claim 1.

4. A composition of claim 1 wherein $R_1$ and $R_2$ are butyl radicals.

5. Organic material normally subject to degradation in the presence of oxygen containing a stabilizing amount of a composition of claim 4.

6. A hydrocarobn selected from the group consisting of lubricating oil and polyolefins containing a stabilizing amount of a composition of claim 4.

7. Lubricating oil containing a stabilizing amount of a composition of claim 4.

8. Lubricating oil containing a stabilizing amount of a composition of claim 4.

9. A composition of claim 4 wherein said phenolic compound has the formula:

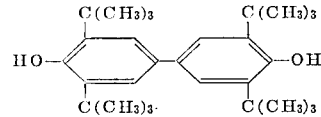

namely, 4,4′-bis(2,6-di-tert-butylphenol).

10. Rubber containing a stabilizing amount of a composition of claim 9.

11. Lubricating oil containing a stabilizing amount of a composition of claim 9.

References Cited
UNITED STATES PATENTS

| | | | |
|---|---|---|---|
| 2,785,188 | 3/1957 | Coe | 252—52 X |
| 2,789,103 | 4/1957 | Weinberg et al. | 260—45.75 |
| 3,077,451 | 2/1963 | Antler | 252—46.4 |
| 3,114,713 | 12/1963 | Coffield | 252—48.2 |
| 3,156,543 | 11/1964 | Coffield et al. | 252—52 X |
| 3,236,772 | 2/1966 | Younghouse et al. | 252—46.4 |

DANIEL E. WYMAN, Primary Examiner

W. H. CANNON, Assistant Examiner

U.S. Cl. X.R.

252—52, 400; 260—45.75, 45.95

PO-1050
(5/69)

UNITED STATES PATENT OFFICE
CERTIFICATE OF CORRECTION

Patent No. 3,530,069               Dated  September 22, 1970

Inventor(s)  James D. O'Neill

It is certified that error appears in the above-identified patent and that said Letters Patent are hereby corrected as shown below:

Column 2, line 57, that portion of the formula reading

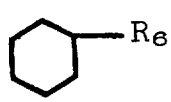  should read  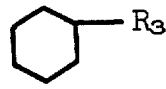

Column 3, line 13, "$R_4$" should read -- $R_5$ --. Column 5, lines 14-15, "pentaerythritol-tetrakis-/3,3,5-di-tert-butyl-4-hydroxyphenyl)-propionate/" should read -- pentaerythritol-tetrakis-/3-(3,5-di-tert-butyl-4-hydroxyphenyl)-propionate/ --.

SIGNED AND
SEALED
DEC 8 - 1970

(SEAL)
Attest:

Edward M. Fletcher, Jr.
Attesting Officer

WILLIAM E. SCHUYLER, JR.
Commissioner of Patents